Dec. 18, 1956     E. R. PRICE     2,774,251

TRANSMISSION OPERATING MECHANISM

Original Filed June 3, 1949     2 Sheets-Sheet 1

INVENTOR.
EARL R. PRICE
BY
H. O. Clayton
ATTORNEY

Dec. 18, 1956   E. R. PRICE   2,774,251
TRANSMISSION OPERATING MECHANISM
Original Filed June 3, 1949   2 Sheets-Sheet 2

INVENTOR.
EARL R. PRICE
BY
H. O. Clayton
ATTORNEY

United States Patent Office 2,774,251
Patented Dec. 18, 1956

2,774,251
TRANSMISSION OPERATING MECHANISM

Earl R. Price, South Bend, Ind., assignor to Bendix Aviation Corporation, South Bend, Ind., a corporation of Delaware Original application June 3, 1949, Serial No. 97,011, now Patent No. 2,695,983, dated November 30, 1954. Divided and this application September 16, 1954, Serial No. 456,430

5 Claims. (Cl. 74—365)

This invention relates to power actuated mechanisms for selectively moving a control element to one or the other of two operative positions, and more particularly to gear shifting mechanisms for operating the speed changing gearing commonly used in coupling the engine or prime mover with the driving wheels or the like of an automotive vehicle or the propeller of a marine craft.

One of the objects of my invention is to provide a power shifting mechanism for motor vehicle change speed mechanism that is electrically selective under the control of the driver.

A further object of the invention is to provide a compact, easily serviced and relatively simple double acting power unit well adapted for use in mechanism for operating the shiftable elements of the two speed axle structure of an automotive vehicle.

Yet another object of my invention is to provide an electric motor for operating a selective gear type of transmission to alternately establish the same in first one or the other of two gear ratio settings, said motor being controlled by a manually operable selector switch and two cut off switches; and the power element of the motor being connected to the transmission by means including torsion spring means.

The above and other objects and features of the invention will appear more fully hereinafter from a consideration of the following description taken in connection with the accompanying drawings where one embodiment of the invention is illustrated by way of example.

The transmission operating power means constituting my invention is preferably employed to operate a two speed axle transmission mechanism of an automotive vehicle; however, it may be employed to operate any power transmitting mechanism of the power plant of a land or marine vehicle wherein said mechanism is selectively movable to two operative positions.

Figure 1:
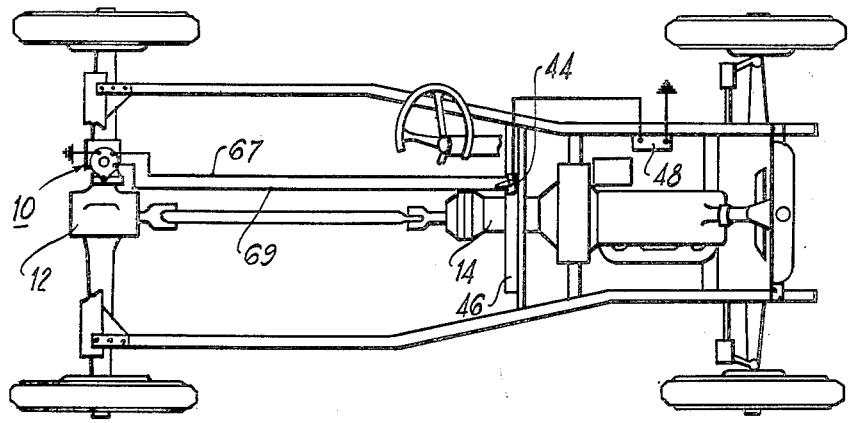
Figure 1 is a diagrammatic view of an automotive vehicle embodying the transmission operating mechanism of my invention.

Referring to Figure 1 a transmission operating power unit 10 is detachably mounted on the carrier of what is known in the automotive art as a two speed axle, that is a part of the driving mechanism of the vehicle effecting a gear ratio in addition to the usual driving ratio and different therefrom. This two speed axle mechanism, actuated by the shifter mechanism of my invention, is indicated by the reference numeral 12 and a change speed transmission mechanism cooperating therewith is indicated by the reference numeral 14. The transmission operating mechanism constituting my invention may be employed to operate a Maybach clutch type of two speed axle, however, any other well known two speed axle construction is equally well operated by the mechanism of my invention.

Figures 2, 3:
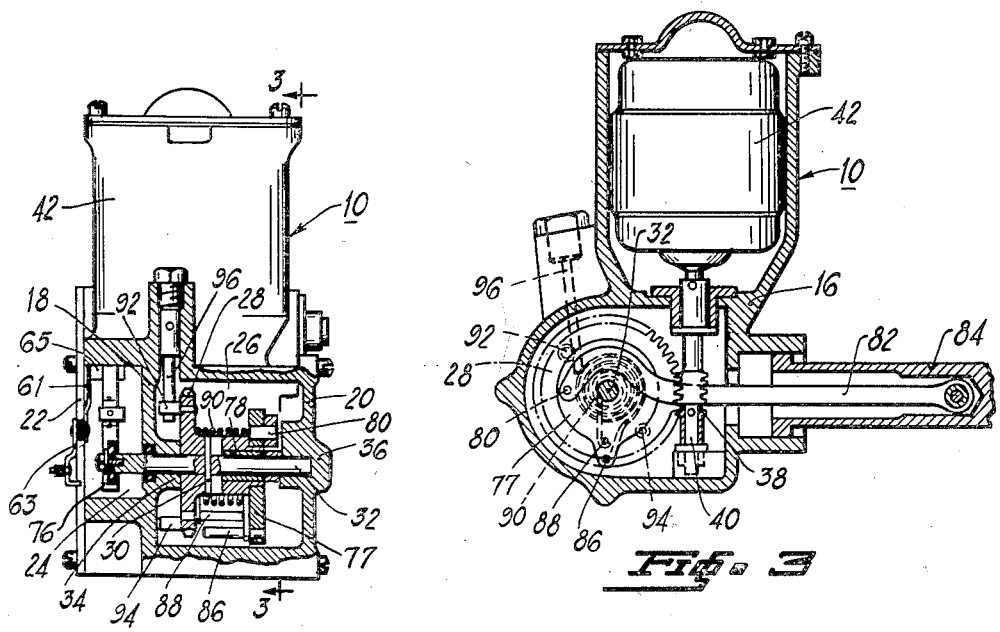
Figure 2 is a sectional view disclosing details of a preferred embodiment of my invention.
Figure 3 is a sectional view, taken on the line 3—3 of Figure 2 disclosing details of the mechanism of the latter figure.
Figure 4:
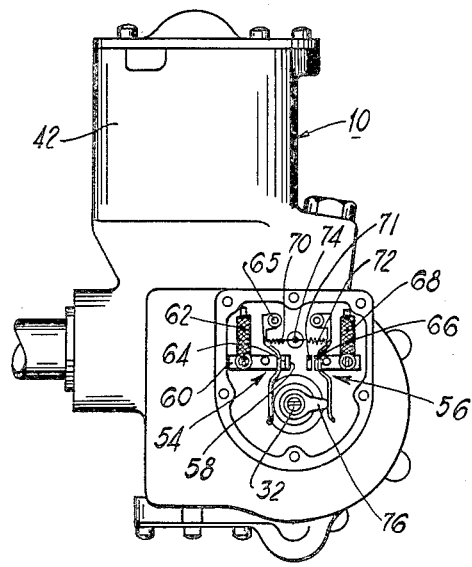
Figure 4 is another view of the mechanism of Figure 2 disclosing the motor operated cut out switch of the electrical control means of Figures 1 and 5.

There is disclosed, in Figures 2 to 4 inclusive, a preferred embodiment of the aforementioned power unit 10 of the transmission operating mechanism of Figure 1, said unit constituting the principle feature of my invention. Describing this unit a casing 16 is provided with a partition 18; and this partition, together with end plates 20 and 22 and the wall of the casing, outline two compartments 24 and 26. The compartment 26 houses a worm gear 28 mounted upon and secured, by a pin 30, to a switch operating shaft 32 journalled at one end in a hub portion 34 of the partition 18, and at its other end in a hub portion 36 of the end plate 20. The worm gear 28 is driven by a worm 38, Figure 3, drivably mounted upon a shaft 40; and the latter is journalled, at its upper and lower ends, in portions of the casing 16. The shaft 40 is drivably connected to the shaft of a double field reversible electric motor 42 of any well known design.

Figure 5:
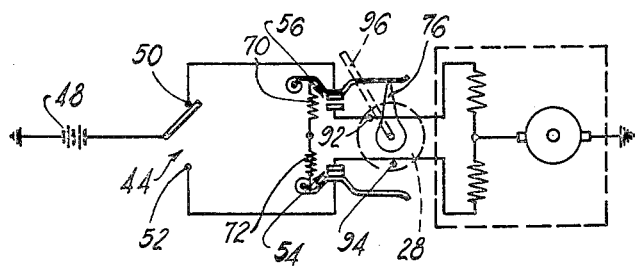
Figure 5 is a diagrammatic view disclosing the electrical hook-up of the electrical mechanism of my invention.

As is disclosed in Figures 1 and 5 the motor 42, which is grounded, may be controlled by electrical means including a manually operated single pole double throw selector switch 44 conveniently mounted on the control panel 46 within the driver's compartment of the vehicle. The movable contact of the switch 44 may be electrically connected to a grounded battery 48; and fixed contacts 50 and 52 of said switch are electrically connected, respectively, to a motor operated cut out switch 54 and a motor operated cut out switch 56, all as is disclosed in Figure 5. The switch 54 preferably includes a fixed contact 58 mounted upon a plate 60 secured to the motor casing and electrically connected, by a conductor 62, to one of the field windings of the motor 42 disclosed in Figure 3. The switch 54 also includes a movable contact 64 pivotally mounted upon a post 65, Figure 4, to which there is secured the upper end of a clip 61 the lower end of which is secured to but insulated from a side wall of the motor casing. A clip 63 likewise secured to the casing, and a conductor 67, Figure 1 connected to the clip complete the electrical connections between the movable contact 64 of the switch 54 and the contact 50 of selector switch 44, the contact 64, post 65, and clip being of electrically conductive material.

The switch 56, being a duplicate of the switch 54, is not described in detail herein. Suffice it to say that a movable contact 66 of the switch 56 is electrically connected, by means including a conductor 69, Figure 1, to the contact 52 of the selector switch 44; and a fixed contact 71 of the switch 56 is electrically connected, by means including a conductor 68, to the other field winding of the motor 42. Completing the description of the switches 54 and 56, springs 70 and 72, Figure 4, secured to a post 74 of electrical insulating material, serve, respectively, to bias the movable contacts 64 and 66 to their switch closed positions. The means for opening the switches 54 and 56 include a cam 76 of electrical insulating material, secured to a reduced end portion of the shaft 32, Figure 2; and as will be apparent from an inspection of Figure 4 the cut-out operation of the switches 54 and 56 is effected by an angular movement of the cam.

Describing now the yieldable transmission operating force transmitting means of the power unit 10 a disk shaped crank 77, rotatably mounted on a sleeve member 78 mounted on the shaft 32, is pivotally connected by a crank pin 80 to a connecting rod 82. As is disclosed in Figure 3 this rod is, at one of its ends, bent around the shaft 32 and is pivotally connected, at its other end, to a hollow rod 84 which is in turn adapted to be connected to the shifter fork of the two speed axle mechanism of Figure 1. As is disclosed in Figure 3 the latter rod is slidably mounted in a portion of the casing 16; and the rod 84 and the rod 82 connected thereto, together constitute a part of the motor unit. As is disclosed in Figure 2, to the crank 77 and worm gear 28 there are secured, respectively, pins 86 and 88. A preloaded torsion spring 90, sleeved over a hub portion of the worm gear and over the sleeve 78, is connected at one of its ends to the pin 86 and at its other end to the pin 88. Stop means, including pins 92 and 94 mounted on the worm gear 28, and a stop 96 mounted in the motor casing, serve to limit the loading of the torsion spring 90 and to control the operation of the cut off switch mechanism.

Briefly describing the operation of the transmission operating unit 10 of Figures 1 to 4 inclusive a closure of the above described selector switch prior to a release of the accelerator results in an energization of the motor 42; and the latter operation results in a rotation of the worm gear 28 to wind up the spring 90. Then when the driver releases the accelerator the driving torque is reversed and the spring 90 expands thereby effecting a transmission operating movement of the rod 82 in one or the other of its two directions of movement depending of course on the particular operation of the transmission selected by the driver.

There is thus provided, by the transmission operating unit 10 together with the controls therefor, an effective and efficient transmission operating mechanism well adapted to operate either a two speed axle of an automotive vehicle or other change speed transmission of the power plant of the vehicle. The motor unit 10 constituting the essence of my invention, includes relatively few moving parts comprising a worm and worm gear driven by a double field reversible electric motor said motor being connected to the transmission by yieldable force transmitting means including a crank and pin mechanism and a spring member. With the unit 10 the timed cutting out of operation of the electric motor, by the operation of the cut off switches, serves, in cooperation with the operation of the stop mechanism, to insure the desired inertia operation of the moving parts to effect a maximum compression of the torsion spring; and with said unit the operation of the yieldable force transmitting means positioned between the worm and worm gear mechanism and the transmission, insures a relatively quiet operation of the transmission.

This application is a division of my application No. 97,011 filed June 3, 1949 said application having matured into U. S. Patent No. 2,695,983 dated November 30, 1954.

Although only one embodiment of the invention has been illustrated and described, various changes in the form and relative arrangements of the parts may be made to suit requirements.

I claim:

1. A power mechanism adapted to operate a change speed transmission of an automotive vehicle, said mechanism including an electric motor having a shaft, a casing, means within the casing comprising a worm gear and worm driving unit drivably connected to said shaft, a transmission operating rod, force transmitting means interconnecting the rod and worm gear including a disk directly connected to the rod and further including a spring interposed between the disk and the worm gear of said unit, said spring being energized when the motor is energized to effect an operation of the unit; cut off switch mechanism for in part controlling the operation of the motor, and means connected to the worm gear for operating the switch mechanism.

2. A power unit adaptable to operate a change speed transmission of an automotive vehicle including a casing, a reversible electric motor housed within a portion of the casing, said motor comprising a drive shaft, a worm gear and worm driving mechanism drivably connected to said shaft, a transmission operating rod mounted in the casing, force transmitting means interconnecting the rod and worm gear including a disk mounted parallel with the worm gear and further including a spring which is energized when the motor is energized to effect an operation of the unit, cut off switch mechanism for in part controlling the operation of the motor, means connected to the worm gear for operating the switch mechanism, and stop means, including a part mounted on the worm gear for limiting the movement thereof, after the switch mechanism has operated to de-energize the motor.

3. A power unit adaptable to operate a two speed axle transmission of an automotive vehicle including, in combination, a double field reversible electric motor, a worm and worm gear mechanism connected to the drive shaft of the motor, a transmission operating rod, a double acting force transmitting means interconnecting the rod and worm gear including a spring connected to the worm gear said spring being compressed when the motor is energized and further including a disk interconnecting the spring and rod, a motor operated cut off switch mechanism for in part controlling the operation of the motor, and means connected to the worm gear for operating the switch mechanism.

4. A power unit adaptable to operate a two speed axle transmission of an automotive vehicle including a double field reversible electric motor, a worm and worm gear unit connected to the drive shaft of the motor, a transmission operating rod, double acting force transmitting means interconnecting the rod and worm gear including a torsion spring which is compressed when the motor is energized, said spring being directly connected to the gear of the worm and worm gear unit, a motor cut off switch mechanism for in part controlling the operation of the motor, means connected to the worm gear for operating the switch mechanism, and stop means for limiting the spring compressive movement of the worm gear, said stop means coming into play after the cut off switch means is operative to de-energize the motor.

5. A preassembled unit for use in the transmission operating mechanism of an automotive vehicle comprising a casing, a motor housed within the casing, a worm and worm gear unit housed within the casing the worm being drivably connected to the drive shaft of the motor, a transmission operating rod slidably mounted in the casing, and force transmitting means interconnecting the rod and worm gear including a crank and pin mechanism, a torsion spring interconnecting the crank of the latter mechanism with the worm gear, and a rod interconnecting the pin of the crank and pin mechanism with the transmission operating rod.

References Cited in the file of this patent

UNITED STATES PATENTS

| | | |
|---|---|---|
| 2,462,779 | Russell | Feb. 22, 1949 |
| 2,589,643 | Thomas et al. | Mar. 18, 1952 |
| 2,599,724 | Russell | June 10, 1952 |
| 2,610,518 | Goedeke et al. | Sept. 16, 1952 |
| 2,695,983 | Price | Nov. 30, 1954 |